(No Model.)
B. W. MITCHELL & E. ROSSER.
CHURN.
No. 359,881. Patented Mar. 22, 1887.
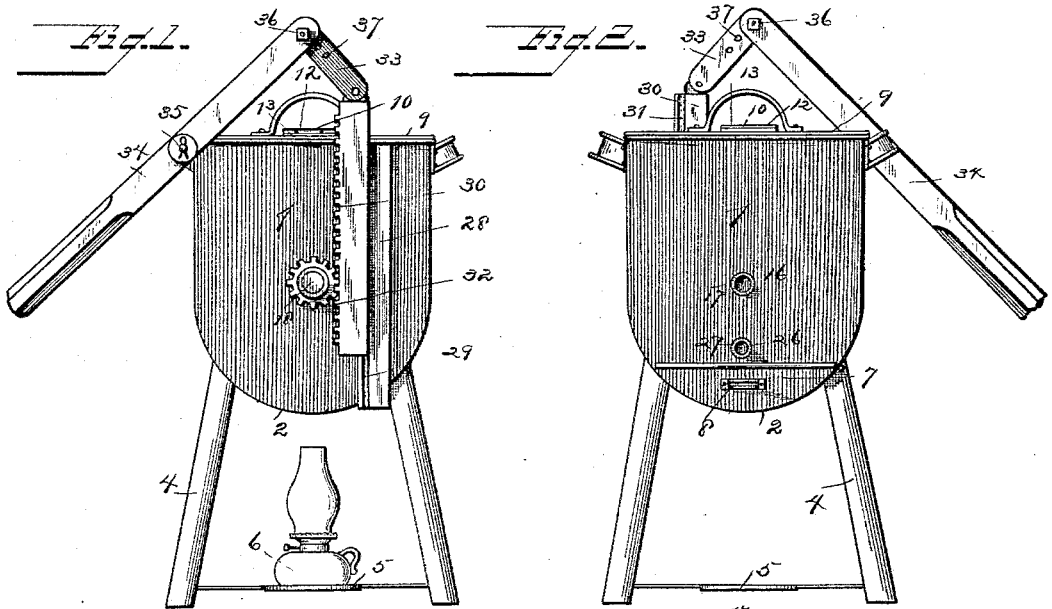
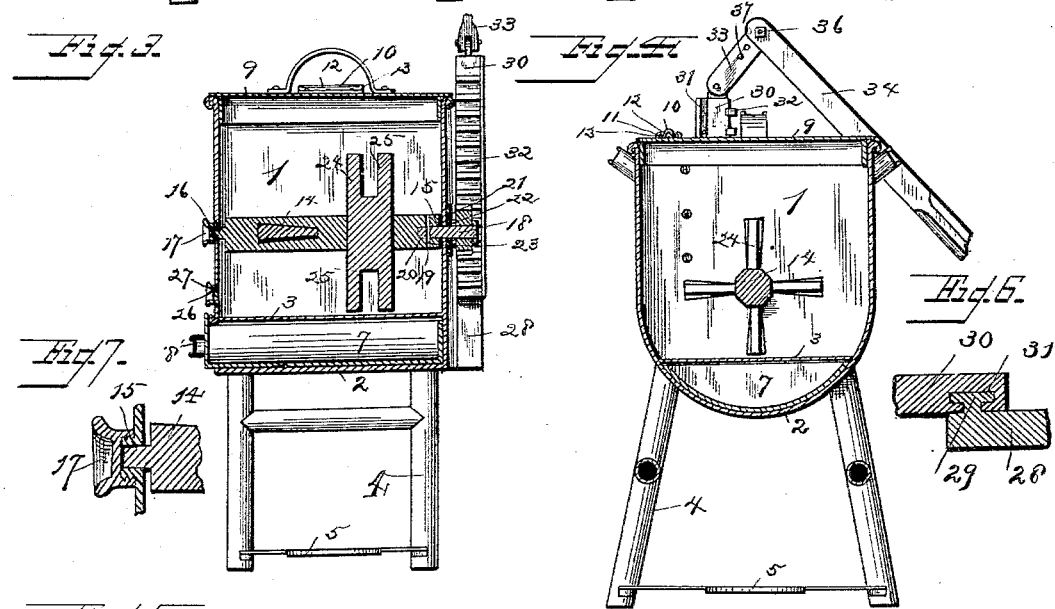
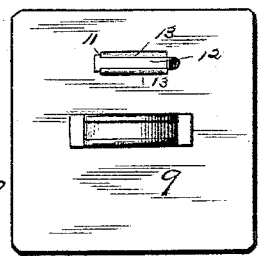
Witnesses
F. L. Orrand
Benj. G. Cowl
Barnard W. Mitchell,
Edward Rosser, Inventors
By their Attorneys
Louis Bagger & Co.

UNITED STATES PATENT OFFICE.

BARNARD W. MITCHELL, OF HUBBARD, AND EDWARD ROSSER, OF BROOKFIELD, OHIO.

CHURN.

SPECIFICATION forming part of Letters Patent No. 359,881, dated March 22, 1887.

Application filed December 11, 1886. Serial No. 221,303. (No model.)

*To all whom it may concern:*

Be it known that we, BARNARD W. MITCHELL and EDWARD ROSSER, residents of Hubbard and Brookfield, respectively, in the county of Trumbull and State of Ohio, have invented certain new and useful Improvements in Churns; and we do hereby declare that the following is a full, clear, and exact description of the invention, which will enable others skilled in the art to which it appertains to make and use the same, reference being had to the accompanying drawings, which form a part of this specification, and in which—

Figure 1 is an end view of our improved churn. Fig. 2 is a similar view seen from the other end. Fig. 3 is an axial sectional view. Fig. 4 is a vertical sectional view. Fig. 5 is a top view of the lid, and Figs. 6 and 7 are detail views.

Similar numerals of reference indicate corresponding parts in all the figures.

Our invention has relation to that class of churns in which a dasher-shaft having a number of radiating dasher-arms is rocked by means of a reciprocating rack-bar engaging a pinion upon the shaft; also, in devices whereby the milk or cream within the churn may be heated or cooled according to the temperature required; and it consists in the improved construction and combination of parts of such a churn, as hereinafter more fully described and claimed.

In the accompanying drawings, the numeral 1 indicates the churn-body, which is formed with a rounded false bottom, 2, below the bottom proper, 3, and this body is supported upon legs 4, having a plate or disk, 5, supported between their lower ends, upon which a lamp, 6, may be supported, the flame of the lamp heating the false bottom of the churn-body when lighted.

A drawer, 7, having a rounded bottom, fits between the bottom of the churn and the false bottom, sliding out at one end, and the free end of the drawer is provided with a suitable handle, 8, by means of which it may be drawn out.

The open top of the body of the churn is closed by a cover, 9, and a thermometer, 10, is secured in a slot, 11, in this cover, a slide, 12, covering the thermometer, and being held in position by means of flanges 13 at the edges of the slot, under which flanges the side edges of the arched slide are confined and slide. A shaft, 14, is journaled in bearings 15 and 16 in the sides of the churn-body, and one of these bearings is closed by means of a screw-cap, 17, upon the outside of the churn.

The short shaft 18 of a pinion, 19, passes through the other bearing, 15, and enters a correspondingly-shaped bore, 20, in the end of the dasher-shaft, and the short pinion-shaft is preferably provided with a washer, 21, bearing against the inner side of the bearing, and with a flange, 22, upon the pinion bearing against the outer side of the bearing, the washer and flange preventing milk or cream from leaking out through the bearing. The inner end of the short shaft is retained in place by means of a pin, 23, passing through the socketed end of the dasher-shaft, and through the short shaft.

The dasher-shaft is provided with flat dasher-boards 24, inserted through the shaft and projecting at right angles to each other, and the outer ends of these boards are cut out, so as to form arms or fingers 25, and the portions of the boards nearest to the sides of the churn are thicker than the inner portions, the boards having a wedge shape from their outer edges to their inner edges, so that when the shaft is revolved with the dashers the inclined surfaces of the dashers, striking the contents of the churn, will serve to force them toward the center of the churn.

The churn is provided near its bottom with an outlet-aperture, 26, which is covered with a screw-cap, 27, similar to the screw-cap 17.

A bar, 28, is secured upon the side of the churn in a vertical position, and is grooved in its sides, so as to form a T-shaped tongue or rib, 29, at the side facing the pinion upon the dasher-shaft, and a bar, 30, having a similarly-shaped groove, 31, in its rear side, slides with the said groove upon the tongue, and has a series of cogs, 32, upon its forward side, which teeth or cogs engage the cogs of the pinion upon the dasher-shaft. An arm, 33, is pivoted to the upper end of this rack-bar, and has its upper end pivoted to the bifurcated inner end of a lever, 34, fulcrumed upon a bolt, 35, projecting from the side of the churn near the cating the rack-bar, which again in its turn will revolve and reciprocate the pinion and the shaft.

During cold weather the temperature of the contents of the churn may be raised to its proper point by filling the drawer with water and placing the lighted lamp under the false bottom, when the water in the drawer will be heated, and will communicate its heat to the contents of the churn, which may thus be brought to the proper temperature, the thermometer in the cover of the churn serving to indicate the temperature within the churn.

During hot weather the drawer may be filled with ice, or it may have a continuous stream of cold water passing through it, when the contents of the churn will be cooled down to the proper temperature.

Having thus described our invention, we claim and desire to secure by Letters Patent of the United States— the purpose shown and set forth.

2. The combination of a churn-body having a curved false bottom below the bottom, and having supporting-legs connected at their lower ends by a plate or shelf, a drawer fitting in the space between the curved false bottom and the bottom, corresponding in shape to the space between them, and a lamp or other heating device supported upon the plate or shelf between the legs, as and for the purpose shown and set forth.

In testimony that we claim the foregoing as our own we have hereunto affixed our signatures in presence of two witnesses.

BARNARD W. MITCHELL.
   EDWARD ROSSER.

Witnesses:
 NATHANIEL MITCHELL,
 MARY J. MITCHELL.